M. J. ZENDER.
BEDPAN.
APPLICATION FILED JUNE 12, 1920.

1,368,874.

Patented Feb. 15, 1921.

Inventor
M. J. Zender.

By Geo. P. Kimmel
Attorney ns in the

UNITED STATES PATENT OFFICE.

MYNARD J. ZENDER, OF WAUSAU, WISCONSIN.

BEDPAN.

1,368,874.　　　Specification of Letters Patent.　　Patented Feb. 15, 1921.

Application filed June 12, 1920. Serial No. 388,549.

*To all whom it may concern:*

Be it known that I, MYNARD J. ZENDER, a citizen of the United States, residing at Wausau, in the county of Marathon and State of Wisconsin, have invented certain new and useful Improvements in Bedpans, of which the following is a specification.

This invention relates to a pan construction, and more particularly to the class of destructible sanitary bed pans.

The primary object of the invention is the provision of a pan of this character, wherein the body thereof is constructed in a novel manner and made from paper, cardboard or the like, so that after use thereof the same can be entirely destroyed, thus rendering the bed pan adaptable particularly for use with patients suffering from contagious diseases.

Another object of the invention is the provision of a pan of this character, wherein the construction and arrangement of the body thereof enables the storage of the same in the least possible space when not in use, for example the same may be stored within a medicine chest and is adaptable for home or hospital uses.

A further object of the invention is the provision of a pan of this character, which is extremely simple in construction, strong, yet light in weight, thoroughly sanitary, and inexpensive to manufacture.

With these and other objects in view, the invention consists in the features of construction, combination and arrangement of parts, as will be hereinafter fully described, illustrated in the accompanying drawing and pointed out in the claims hereunto appended.

In the accompanying drawing.

Similar reference characters indicate corresponding parts throughout the several views in the drawing.

Figure 1:
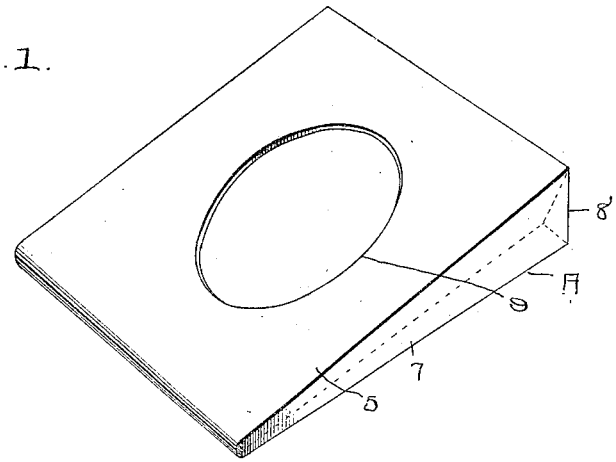
Figure 1 is a perspective view of a bed pan constructed in accordance with the invention.
Figure 2:
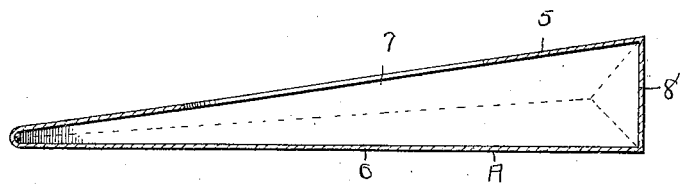
Fig. 2 is a vertical longitudinal sectional view thereof.

Referring to the drawing in detail, A designates generally the bed pan, preferably of the shape shown in Fig. 1 of the drawing, although the same may be of any other desirable shape and of the required size, the body of said pan being made from heavy paper, cardboard or the like and includes a top section 5, bottom section 6, side walls 7 and an end wall 8, respectively. The top and bottom sections 5 and 6 are integrally formed or joined with the side and end walls 7 and 8 in a manner to provide a fluidtight container, while the said side and end walls 7 and 8 may be suitably creased to provide necessary fold lines for the collapsing of the body of the bed pan A, when the same is not in use.

Formed in the top section 5 is an opening 9 of the required size to permit the use of the bed pan A in the ordinary well known manner and after said use the same is adapted to be entirely destroyed by the complete burning thereof or otherwise.

The construction of the bed pan A assures sanitary conditions, especially in the use thereof with patients suffering with contagious diseases, as immediately after the use of the pan the same is completely destroyed, thus overcoming the disadvantages of the ordinary bed pan, which necessitates time and trouble in the cleaning thereof with the possibility of unsanitary conditions arising.

It is of course understood that changes, variations and modifications may be made in the invention, such as fall properly within the scope of the appended claims, without departing from the spirit of the invention or sacrificing any of its advantages.

What is claimed is:

1. A bed pan construction, comprising a body made from paper stock having top and bottom sections, side and end walls joined at their meeting edges with said sections, creases formed in said side walls permitting said body to be collapsed and said top section being provided with a hole.

2. A bed pan construction, comprising a body formed from paper stock having an inclined top section, a bottom section, side walls, and an end wall, the meeting edges of the sections and walls being united to render the body fluidtight, said top section having an opening, and longitudinally extending creases throughout the length of the side walls permitting said body to be collapsed.

In testimony whereof, I affix my signature hereto.

MYNARD J. ZENDER.